United States Patent
Yang et al.

(10) Patent No.: US 10,057,760 B2
(45) Date of Patent: Aug. 21, 2018

(54) APPARATUS AND METHODS FOR ELECTRONIC SUBSCRIBER IDENTITY MODULE (ESIM) INSTALLATION NOTIFICATION

(71) Applicant: Apple Inc., Cupertino, CA (US)

(72) Inventors: Xiangying Yang, Cupertino, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/340,933

(22) Filed: Nov. 1, 2016

(65) Prior Publication Data

US 2017/0127264 A1 May 4, 2017

Related U.S. Application Data

(60) Provisional application No. 62/249,906, filed on Nov. 2, 2015.

(51) Int. Cl.
*H04W 8/18* (2009.01)
*H04W 4/60* (2018.01)
(Continued)

(52) U.S. Cl.
CPC .......... *H04W 8/183* (2013.01); *H04L 9/3247* (2013.01); *H04L 63/0428* (2013.01);
(Continued)

(58) Field of Classification Search
CPC ..... H04W 8/183; H04W 12/02; H04W 4/003; H04W 8/205; H04W 12/10; H04W 12/04;
(Continued)

(56) References Cited

U.S. PATENT DOCUMENTS

2011/0081950 A1 4/2011 Guven
2014/0298018 A1 10/2014 Haggerty et al.
(Continued)

FOREIGN PATENT DOCUMENTS

CN 104703170 A 6/2015
WO 2014030893 A1 2/2014

OTHER PUBLICATIONS

"Remote Provisioning Architecture for Embedded UICC Technical Specification," GSM Association, Version 3.0, Jun. 30, 2015, 301 pages.
(Continued)

*Primary Examiner* — Chuong A Ngo
(74) *Attorney, Agent, or Firm* — Dickinson Wright RLLP

(57) ABSTRACT

Methods and apparatus for provisioning electronic Subscriber Identity Module (eSIM) data by a mobile device are disclosed. Processing circuitry of the mobile device transfers encrypted eSIM data to an embedded Universal Integrated Circuit Card (eUICC) of the mobile device as a series of data messages and receives corresponding response messages for each data message from the eUICC. The response messages from the eUICC are formatted with a tag field that indicates encryption and signature verification properties for the response message. Different values in the tag field indicate whether the response message is (i) encrypted and verifiably signed, (ii) verifiably signed only, or (iii) includes plain text information. Response messages without encryption are readable by the processing circuitry, and processing of the response messages, including forwarding to network elements, such as to a provisioning server are based at least in part on values in the tag field.

20 Claims, 7 Drawing Sheets

(51) Int. Cl.
- *H04L 29/06* (2006.01)
- *H04W 12/04* (2009.01)
- *H04W 12/10* (2009.01)
- *H04W 8/20* (2009.01)
- *H04W 4/00* (2018.01)
- *H04W 12/02* (2009.01)
- *H04L 9/32* (2006.01)

(52) U.S. Cl.
CPC ............ *H04W 4/003* (2013.01); *H04W 4/60* (2018.02); *H04W 8/205* (2013.01); *H04W 12/02* (2013.01); *H04W 12/04* (2013.01); *H04W 12/10* (2013.01); *H04L 63/0823* (2013.01); *H04L 2209/80* (2013.01)

(58) Field of Classification Search
CPC ............ H04L 63/0428; H04L 63/0823; H04L 2209/80
See application file for complete search history.

(56) References Cited

U.S. PATENT DOCUMENTS

| | | |
|---|---|---|
| 2014/0349617 A1 | 11/2014 | Li et al. |
| 2015/0038119 A1 | 2/2015 | Azuma et al. |
| 2015/0110028 A1 | 4/2015 | Wu |
| 2015/0134958 A1 | 5/2015 | Merrien et al. |
| 2015/0281964 A1 | 10/2015 | Sec et al. |
| 2015/0303966 A1* | 10/2015 | Lee ...................... H04B 1/3816 455/466 |
| 2016/0283216 A1 | 9/2016 | Gao |
| 2017/0156051 A1* | 6/2017 | Park ...................... H04W 8/205 |

OTHER PUBLICATIONS

International Patent Application No. PCT/US216/59957—International Search Report and Written Opinion dated Feb. 15, 2017.
Singapore Patent Application No. 10201609129S—Search Report and Written Opinion dated Aug. 15, 2017.

* cited by examiner

600

| SW1 | SW2 | SW1/SW2 Meaning |
|---|---|---|
| '6A' | '80' | Incorrect values in command data |
| '6A' | '84' | Not enough memory space |
| '6A' | '88' | Referenced data not found |

610

| SW1 | SW2 | TAG | SW1/SW2 Meaning as defined in GP TAG Meaning |
|---|---|---|---|
| | | 'A' | SCP03t (encrypted) responses (TLV) |
| Response data | | 'B' | Signed responses (TLV) |
| | | 'C' | Plain text responses (TLV) |

*FIG. 6*

APPARATUS AND METHODS FOR ELECTRONIC SUBSCRIBER IDENTITY MODULE (ESIM) INSTALLATION NOTIFICATION

CROSS-REFERENCE TO RELATED APPLICATIONS

This Application claims the benefit of U.S. Provisional Patent Application No. 62/249,906, entitled "APPARATUS AND METHODS FOR ELECTRONIC SUBSCRIBER IDENTITY (ESIM) INSTALLATION NOTIFICATION" and filed Nov. 2, 2015, the content of which is incorporated herein by reference in its entirety for all purposes.

FIELD

The described embodiments set forth techniques for installing electronic Subscriber Identity Modules (eSIMs) with enhanced notification messaging on embedded Universal Integrated Circuit Cards (eUICCs) included in mobile devices.

BACKGROUND

Many mobile devices are configured to use removable Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card, (commonly referred to as a Subscriber Identity Module (SIM) card), which is configured to be inserted into a UICC-receiving bay included in a mobile device. In more recent implementations, however, UICCs are being embedded directly into system boards of mobile devices. These embedded UICCs (eUICCs) can provide several advantages over traditional, removable UICCs. For example, some eUICCs include a rewritable memory that can facilitate installation, modification, and/or deletion of one or more eSIMs, which can provide for new and/or different services and/or updates for accessing extended features provided by MNOs. An eUICC can store a number of MNO profiles—also referred to herein as eSIMs—and can eliminate the need to include UICC-receiving bays in mobile devices. Moreover, eSIMs can be remotely provisioned to mobile devices, which can substantially increase flexibility when users travel to different countries, migrate their phone numbers to different MNOs, and the like.

Presently, a common approach for managing eSIMs of mobile devices is MNO-centric, and involves network equipment of an MNO, such as a provisioning server, communicating directly with an eUICC of a mobile device through an over-the-air (OTA) secure channel. With the OTA secure channel established between the provisioning server and the eUICC of the mobile device, the provisioning server can remotely manage an appropriate eSIM of the eUICC included in the mobile device by sending commands to and receiving responses from the eUICC over the OTA secure channel.

The MNO-centric provisioning technique can have a number of drawbacks. Communication between the network equipment of the MNO and the eUICC of the mobile device can require radio resources while loading the eSIM (and/or an update) to the eUICC. In addition, external processors, such as a processor of the mobile device outside of the eUICC, can pass encrypted messages between the eUICC and the network equipment, and can have limited knowledge of the status of the loading and installation process.

SUMMARY

Representative embodiments set forth techniques for provisioning of electronic Subscriber Identity Module (eSIM) data at a mobile device. According to some embodiments, mobile device processing circuitry external to an embedded Universal Integrated Circuit Card (eUICC) included in the mobile device obtains an encrypted eSIM package from a network element, e.g., an MNO provisioning server, and provides the encrypted eSIM package to an eSIM management entity on the eUICC. The eSIM management entity on the eUICC can be an application that includes specific security service capabilities, such as for secure communication and encryption/decryption. The processing circuitry of the mobile device can transfer the encrypted eSIM package to the eSIM management entity in a series of data messages and receive responses from the eSIM management entity. The responses from the eSIM management entity can be formatted to include a tag field that indicates one or more of: (i) the response is securely encrypted and not readable by the processing circuitry, (ii) the response is signed, verifiable, and readable by the processing circuitry, or (iii) the response includes plain text information readable by the processing circuitry. The processing circuitry can return securely encrypted responses to one or more network elements, e.g., the MNO provisioning server. The processing circuitry can also process portions of signed, verifiable, and readable responses, such as for error messages and/or warnings, and can return the signed, verifiable, and readable responses to one or more network elements. The processing circuitry can also process plain text information readable messages without forwarding the plain text information messages to one or more network elements. In some embodiments, the securely encrypted responses are encrypted with a provisioning session key valid for a communication session with the network element, e.g., the MNO provisioning server. In some embodiments, the signed, verifiable, and readable responses are signed by the eUICC with a static secret key and/or accompanied by a certificate of the eUICC. In some embodiments, only a final successful response from the eUICC is communicated to the network element, while intermediate successful responses, received by the processing circuitry from the eUICC during the transfer of the eSIM package to the eUICC, are not relayed to the network element.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 6 illustrates tables of formats for fields in response messages communicated between an eUICC and processing circuitry of a mobile device, according to some embodiments.

DETAILED DESCRIPTION

Figure 1:
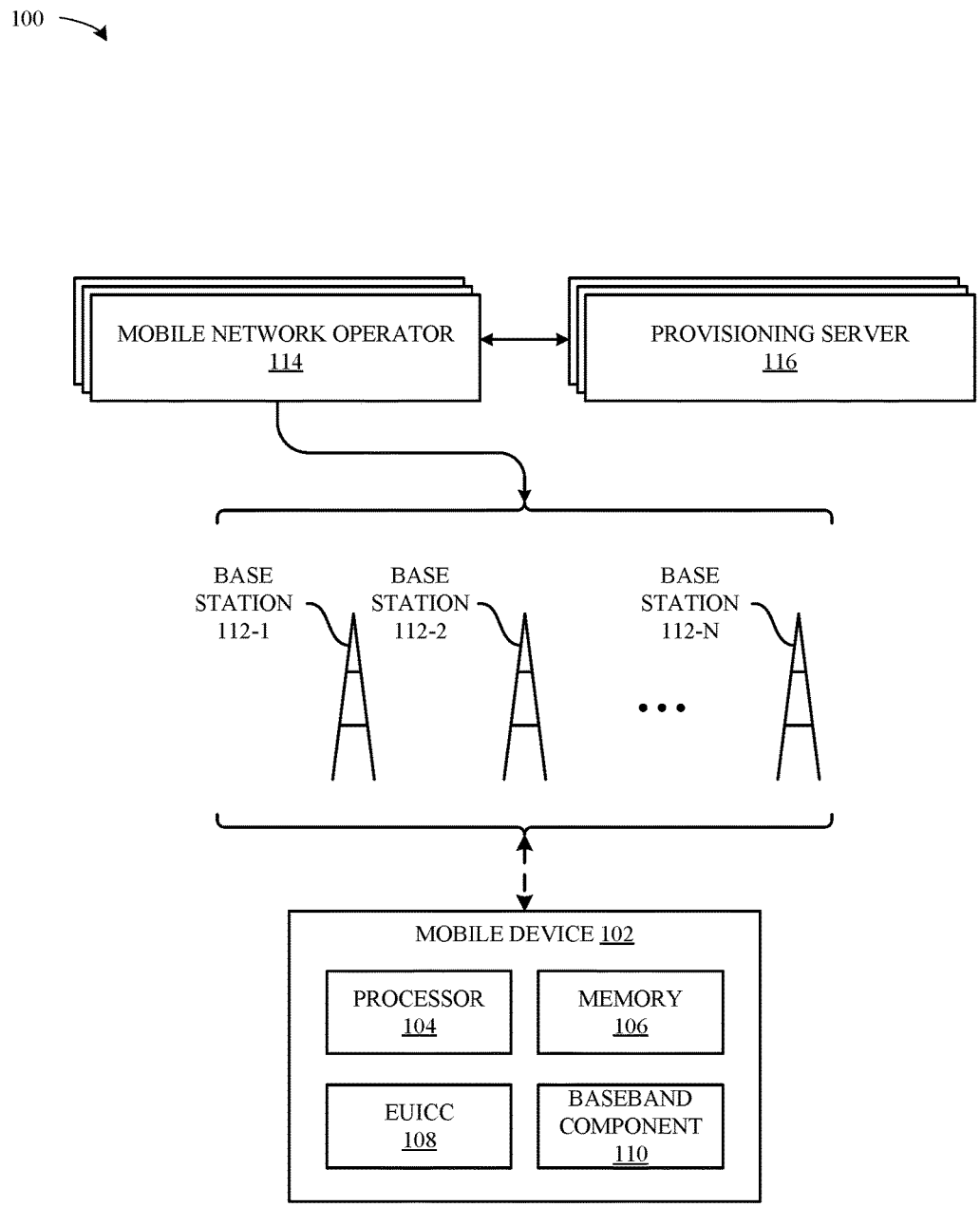
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments of methods and apparatus presented herein provide for communication between an entity external to an eUICC of a mobile device, such as during loading of an eSIM package or portions thereof to the eUICC from processing circuitry of the mobile device. Response messages from the eUICC to the processing circuitry of the mobile device can include a tag field that indicates whether encryption and/or signing of the response message is used. In some embodiments, the response messages include a tag field having a value that indicates the response message is encrypted in accordance with an encryption protocol used for secure communication with a network element, such via a secure channel between the eUICC and an MNO provisioning server. Encrypted response messages of this type can be collected by the processing circuitry of the mobile device and forwarded to the network element. In some embodiments, the network element is a Subscription Manager-Data Preparation (SM-DP) unit operating in accordance with a 3GPP communication protocol and/or a GlobalPlatform specification. In some embodiments, the encrypted response messages are formatted and/or encrypted in accordance with a Secure Channel Protocol Version 03 (or modification thereof), e.g., SCP03 and/or SCP03t as described in an extension of the GlobalPlatform Specification. In some embodiments, the encrypted response messages are not readable by the processing circuitry of the mobile device and are returned to a corresponding network element, e.g., the SM-DP unit. In some embodiments, the response messages include a tag field having a value that indicates the response message is signed by the eUICC and readable by at least the processing circuitry of the mobile device. In some embodiments, the eUICC signed responses are signed using a static secret key. In some embodiments, the eUICC signed responses are accompanied by an eUICC certificate. In some embodiments, the eUICC signed responses are processed by the processing circuitry (or by other entities external to the eUICC) for error and/or warning indications, which can provide information about the status of loading and/or installation of an eSIM in the eUICC to the processing circuitry (or to other external entities) outside of the eUICC. In some embodiments, eUICC responses are returned to appropriate network elements, e.g., to an MNO provisioning server and/or to an SM-DP unit. In some embodiments, the response messages include a tag field having a value that indicates the response message contains plain text information. In some embodiments, plain text response messages are read and processed by the processing circuitry of the mobile device and are not forwarded to other external entities, e.g., to a provisioning server and/or SM-DP unit.

In some embodiments, communication of an eSIM package between a network element, e.g., an MNO provisioning server and/or an SM-DP unit, and processing circuitry of a mobile device occurs separately from loading and/or installation of the eSIM package into the eUICC of the mobile device, e.g., the loading and/or installation occurs off-line and communication of successful installation to the network element occurs at the end of the installation process. In some embodiments, error messages and/or response messages with warning indications are communicated to the network element by the processing circuitry of the mobile device during the loading and/or installation of the eSIM package to the eUICC, e.g., based on response messages received from the eUICC that include error indications and/or warning indications, while success messages are not provided to the network element until completion of the loading and/or installation process. In some embodiments, the processing circuitry of the mobile device uses information provided in non-encrypted response messages, e.g., error messages, warning indication messages, plain text information messages, and/or signed readable messages, in order to provide status indications of progress of the loading and/or installation of the eSIM package via a user interface of the mobile device. In some embodiments, the processing circuitry interrupts the loading process of an eSIM package based on receipt of essential errors, such as for a network access application (NAA) installation failed message, a security error message, and/or a memory error message, etc., to provide for quicker error recovery. In some embodiments, an operating system (OS) element of the eUICC triggers atomic clean up operations autonomously. In some embodiments, the processing circuitry of the mobile device provides commands to cause the eUICC to delete improperly installed eSIM package data.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different MNOs 114, and a set of provisioning servers 116 that are in communication with the MNOs 114. According to the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include processing circuitry, which can include a processor 104 and a memory 106, an eUICC 108, and a baseband component 110. These components work in conjunction to enable the mobile device 102 to provide useful features to a user of the mobile device 102, such as localized computing, location based services, and Internet connectivity. The eUICC 108 can be configured to store multiple eSIMs for accessing the different MNOs 114 through the base stations 112. For example, the eUICC 108 can be configured to store and manage one or more eSIMs for one or more MNOs 114 for different subscriptions to which the mobile device 102 is associated. To be able to access services provided by the MNOs, an eSIM is provisioned to the eUICC 108. In addition, eSIMs stored on the eUICC 108 can be updated, modified, activated, deactivated, and/or deleted via communication between the eUICC 108 of the mobile device 102 and applicable network equipment, such as the provisioning servers 116 (or other equivalent or similar network-based eSIM management entities, such as an SM-DP). In some embodiments, eSIMs are pre-stored in the eUICC 108 in an inactive state, and during a provisioning process, the eUICC 108 obtains MNO credentials (e.g., keys, etc.), service information (e.g., carrier information, services subscribed to), and/or other information, and uses this information to activate the eSIM. In some embodiments, eSIMs are not pre-stored in the eUICC 108, and the eUICC 108 obtains one or more eSIMs from one or more associated provisioning servers 116. It is noted that provisioning servers 116 can be maintained by a manufacturer of the mobile device 102, the MNOs 114, third party entities, and the like. Communication of eSIM data between a provisioning server 116 and the eUICC 108 can use a secure communication channel, over which a series of commands between the provisioning server 116 and the eUICC 108 results in provisioning (or other management) of an eSIM to (or on) the eUICC 108. In some embodiments, the eSIM data is communicated via the processing circuitry, e.g., the processor 104, of the mobile device 102. In some embodiments, the eSIM data is communicated to the processor 104 of the mobile device 102 for loading to and/or installing in the eUICC 108 while connected to the provisioning server 116. In some embodiments, the eSIM data is communicated to the processing 104 for subsequent loading to and/or installing in the eUICC 108 without a parallel connection to the provisioning server and/or secure through connection between the provisioning server and the eUICC 108 during the loading and/or installation process, e.g., using an offline process. As described further herein, response messages from the eUICC 108 during a loading and/or installation process can include a tag field with values that indicate whether the response message is readable by the processor 104. In some embodiments, different response messages can be provided with different types of encryption and/or signing and/or plain text information to allow for a mixture of secure encrypted messages, readable by the provisioning server 116 but not by the processor 104 of the mobile device, signed messages, that are readable and verifiable by both the provisioning server 116 and the processor 104, and plain text messages that are openly readable by entities external to the eUICC 108. Although not illustrated in FIG. 1, the mobile device 102 can also be configured to include a receiving bay for a removable UICC (e.g., a SIM card), on which an eSIM can be managed in a similar manner using the techniques described herein.

Figure 2:
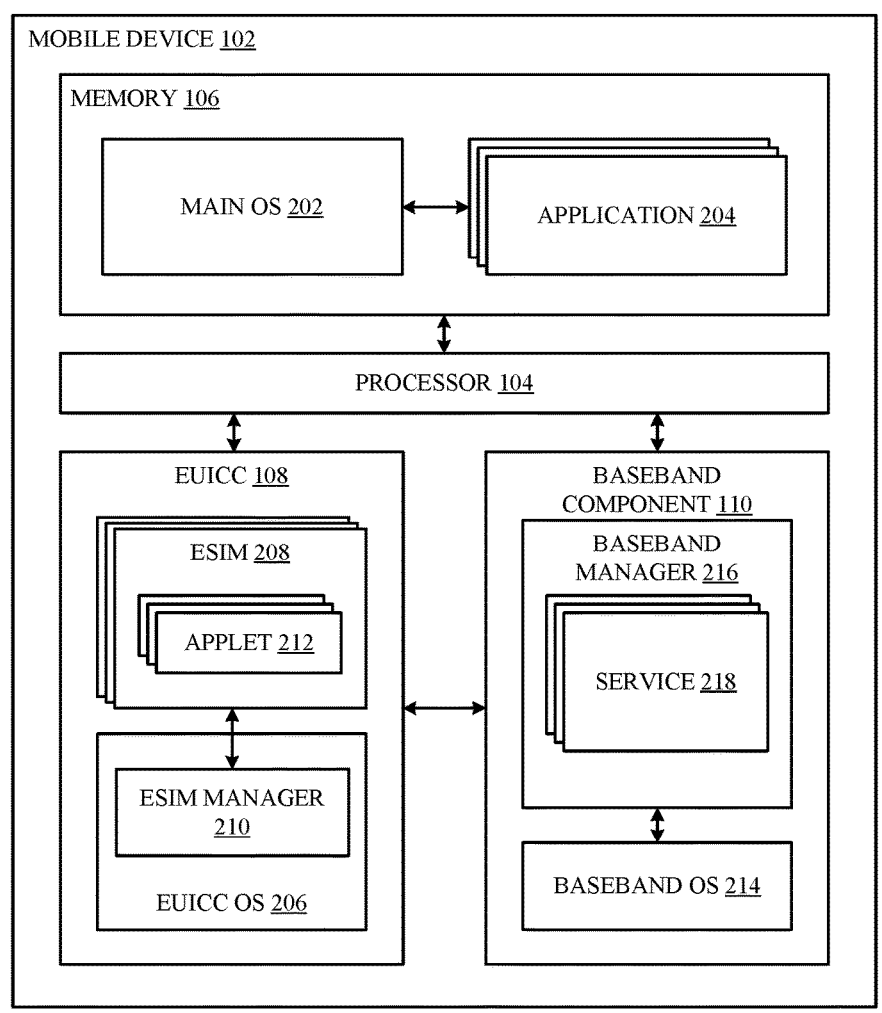
FIG. 2 illustrates a block diagram of a more detailed view of exemplary components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by activating, deactivating, modifying, or otherwise performing management of the eSIMs 208 within the eUICC 108 and providing the baseband component 110 with access to the eSIMs 208 to provide access to wireless services for the mobile device 102. The eUICC 108 OS can include an eSIM manager 210, which in some embodiments can be an Issue Security Domain (ISD) level application, a "security domain" in accordance with a GlobalPlatform specification, a security domain associated with one or more eSIMs and that calls additional eUICC OS installation services, and/or an application that implements a specific set of security services, e.g., for establishing and managing a secure channel and/or to provide encryption/decryption functions. The eSIM manager 210 can perform management functions for various eSIMs as described further herein. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage hardware resources of the baseband component 110 (e.g., a processor, a memory, different radio components, etc.). According to some embodiments, the baseband component 110 can implement a manager 216 that is configured to interface with the eUICC 108 to implement various techniques described herein, which can include establishing a secure channel with a provisioning server 116 and obtaining information (such as eSIM data) from the provisioning server 116 for purposes of managing eSIMs 208, including but not limited to provisioning, loading, installing, adding, modifying, updating, deleting, or performing other management operations for one or more eSIMs 208. As also shown in FIG. 2, the manager 216 can be configured to implement services 218, which represents a collection of software modules that are instantiated by way of the various applets 212 of activated eSIMs 208 that are included in the eUICC 108. For example, services 218 can be configured to manage different connections between the mobile device 102 and MNOs 114 according to the different eSIMs 208 that are activated within the eUICC 108.

Figure 3:
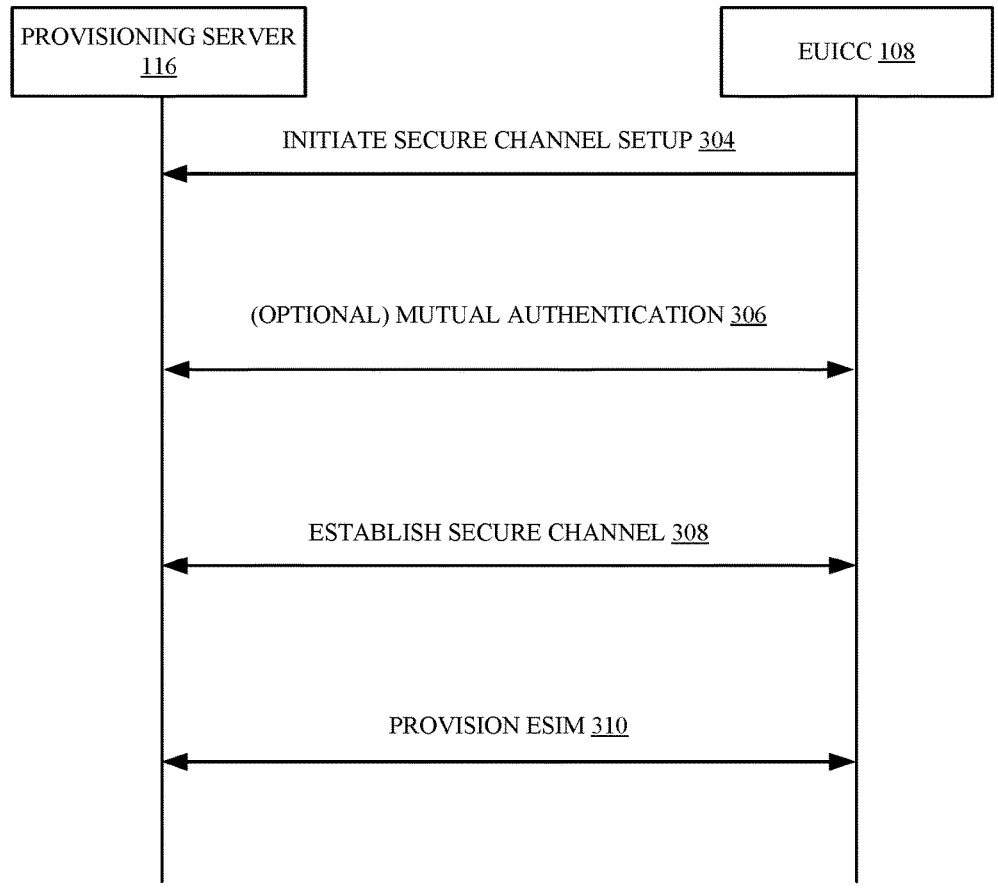
FIG. 3 illustrates a sequence diagram of an exemplary method for provisioning an eSIM for storage on an eUICC of a mobile device of FIG. 1, according to some embodiments.

FIG. 3 illustrates a sequence diagram 300 by which the eUICC 108 of the mobile device 102 can be provisioned an eSIM package from the provisioning server 140. In some embodiments, a provisioning server 140 "pushes" the eSIM package to the eUICC 108, e.g., to install an update to an existing eSIM 208 of the eUICC 108 or to provision an eSIM 208 to the eUICC 108 in response to a request from the mobile device 102 (or via another path not shown). In some embodiments, the eSIM package (and/or contents of an eSIM 208 included therein) is formatted in accordance with a standards-based communications protocol or specification, e.g., a specification of 3GPP, ETSI, IEEE, GlobalPlatform or other wireless standards organization. In some embodiments, the eSIM package and/or its contents are formatted in accordance with a communications industry de facto standard format. In some embodiments, the eSIM package received by the eSIM manager 210 from the provisioning server 140 is encrypted, e.g., to provide a level of security protection for the eSIM package. In 304, the eUICC 108 initiates establishment of a secure channel with the provisioning server 116. In 306, the eUICC 108 and the provisioning server 116 can exchange messages to provide mutual authentication. In 308, a secure channel is established between the eUICC 108 and the provisioning server 116. In 310 an eSIM package is communicated via the secure channel to the eUICC 108. In some embodiments, the eSIM package is encrypted with a secure channel protocol, e.g., SCP03 or SCP03t, in accordance with a GlobalPlatform and/or 3PGG specification. In some embodiments, the eSIM package is communicated by the provisioning server 116 via processing circuitry of the mobile device 102, e.g., via the processor 104, to the eUICC 108 as a series of encrypted messages, and the eUICC 108 provides a series of encrypted and signed messages to the processor 104 of the mobile device 102 to return to the provisioning server 116 during eSIM provisioning 310. While the secure channel established between the provisioning server 116 and the eUICC 108 provides for encrypted and verifiable communication, multiple responses from the eUICC 108 during the provisioning 310 can reiterate ongoing (but not yet complete) successful loading and/or installation of the eSIM, with each of the multiple responses from the eUICC 108 to be forwarded to the provisioning server 116, which adds to loading of the radio access network through a connection with the provisioning server 116 during the loading and installation process (rather than providing for an offline loading and/or installation of the eSIM package to the eUICC 108). In addition, processing circuitry of the mobile device 102 external to the eUICC 108 and in the communication path between the eUICC 108 and the provisioning server 116 can load the eSIM package using multiple loading commands that are not necessarily aligned with boundaries for responses, e.g., not aligned with an SCP03 or SCP03t boundary for an SM-DP unit. Without readable information accessible to the processing circuitry of the mobile device 102, limited or no error notification and/or error recovery during the loading and/or installation process can be possible, when only encrypted response messages are provided by the eUICC 108 for forwarding to the provisioning server 116.

Figure 4:
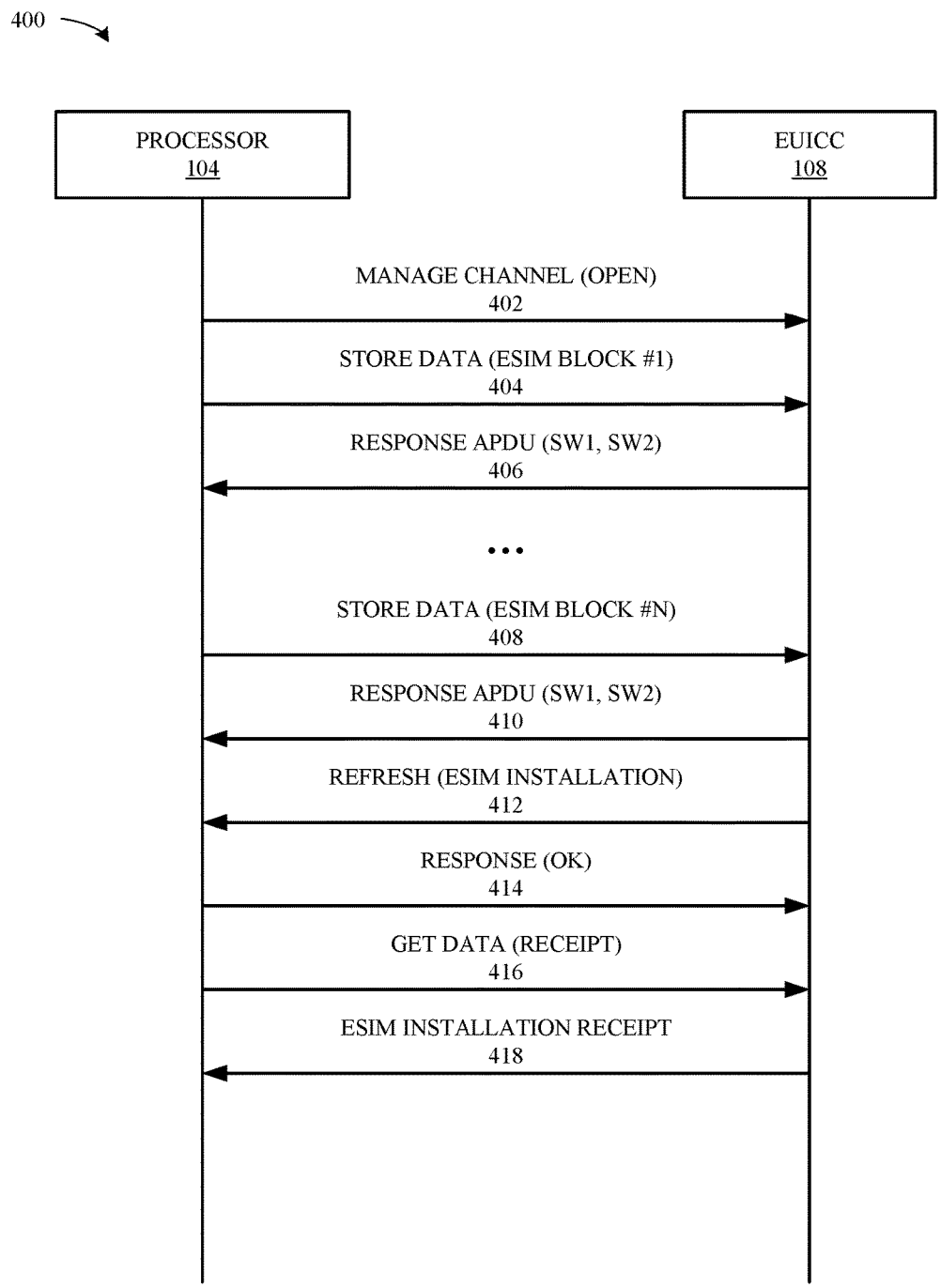
FIG. 4 illustrates a sequence diagram for transferring an eSIM to the eUICC of the mobile device of FIG. 1, according to some embodiments.

FIG. 4 illustrates a sequence diagram 400 of a method for transferring an eSIM package from processing circuitry, e.g., the processor 104, of the mobile device 102 to the eUICC 108. In 402, the processor 104 opens a channel with the eUICC 108. In some embodiments, the channel between the processor 104 and the eUICC 108 is an unprotected logical channel. In some embodiments, the channel between the processor 104 and the eUICC 108 is a secure channel, such when the processor 104 of the mobile device 102 establishes a channel with an eUICC in another mobile device (not shown). In some embodiments, encryption for communication via the channel between the processor 104 and the eUICC 108 uses a public key encryption scheme, e.g., Rivest Shamir Adleman (RSA) encryption, for communication between the processor 104 and the eUICC 108. The processor 104 uses a sequence of loading commands to load blocks of the eSIM package, e.g., STORE DATA (eSIM Block #1) in 404 through STORE DATA (eSIM Block #N) in 408 (intervening blocks not explicitly shown). The processor 104 receives corresponding responses from the eUICC 108, e.g., RESPONSE APDU (SW1, SW2) in 406 through 410 (intervening responses for each block not explicitly shown). In some embodiments, the responses received in 406 through 410 from the eUICC 108 are formatted as Response Application Protocol Data Units (APDUs) and include status words (e.g., SW1, SW2) having values that provide information about the progress of loading and/or installation of the eSIM 208 to the eUICC 108. In some embodiments, the eUICC 108 performs decryption of the eSIM package blocks and installs them, e.g., in a security domain on the eUICC 108. In some embodiments, a network entity, e.g., the provisioning server 116 and/or an SM-DP unit, provides the encrypted eSIM package to the processor 104 before the loading of the blocks occurs, and thus during the loading and installation process to the eUICC 108, a provisioning security context need not be maintained with the network entity. In some embodiments, the processor 104 collects responses during the loading and/or installation process, such as warning messages, error messages, success messages, receipt messages. In some embodiments, the warning messages, error messages, success messages, and/or receipt messages are encrypted, e.g., with an RSA algorithm, and readable (with decryption) by the processor 104. In some embodiments, the warning messages, error messages, success messages, and/or receipt messages are sent in plain text and are readable without decryption by the processor 104. In some embodiments, the warning messages, error messages, success messages, and/or receipt messages are signed by the eUICC 108, verifiable by the processor 104. In some embodiments, a set of collected warning messages, error messages, success messages, and/or receipt messages are passed to a network entity, e.g., the provisioning server 16 and/or the SM-DP unit, e.g., to indicate progress and/or as an installation receipt. In 412 the eUICC 108 provides a refresh message to the processor 104, which responds in turn in 414 with an OK response message. In 416, the processor 104 sends a Get Data command requesting a receipt for the installation of the eSIM 208 from the eUICC 108, and in 418 the eUICC 108 provides the eSIM installation receipt to the processor 104. The processor 104 can forward the eSIM installation receipt to one or more network entities, e.g., to the provisioning server 116 and/or the SM-DP unit. In some embodiments, the communication channel between the processor 104 and the eUICC 108 is trusted to be secure, and the response messages can be sent in plain text from the eUICC 108 to the processor 104. In some embodiments, the communication channel between the processor 104 and the eUICC 108 can use an encryption protocol known to the processor 104 and the eUICC 108 to enhance secure communication between them. With the offline process shown in FIG. 4, communication between network entities, e.g., the provisioning server 116 and/or the SM-DP unit, can be separated from communication between the processor 104 and the eUICC 108, without requiring a direct secure connection between the network entity and the eUICC 108 to load and install the SIM package. With conventional loading and installation of eSIMs 208, e.g., as shown in FIG. 3, where a secure channel is used directly between the eUICC 108 and the network entity, with the processing circuitry of the mobile device 102 serving as a pass through only, the processing circuitry of the mobile device, e.g., the processor 104 can be unable to receive plain text notifications and/or readable and/or verifiable messages from the eUICC 108 with which to determine progress and/or to provide for local error notification and/or error recovery. The encrypted response messages from the eUICC 108, in the conventional approach, can be readable by the network entity and not by the processing circuitry of the mobile device 102 external to the eUICC 108.

Figure 5:
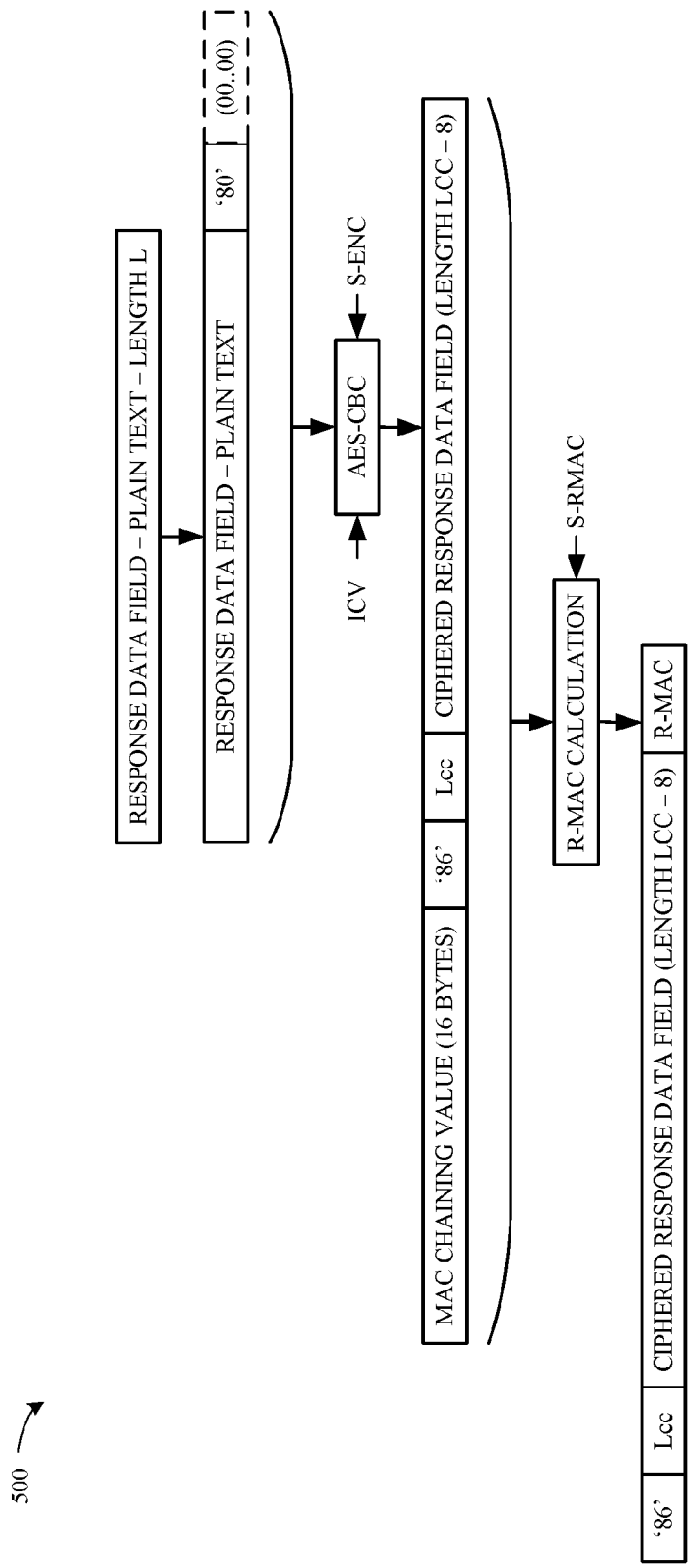
FIG. 5 illustrates a diagram for encrypting and signing a message for communication between an eUICC and a network element, according to some embodiments.

FIG. 5 illustrates a flow diagram 500 of an encryption and signing process that can be used to protect and provide for verification of data, such as for communicating an encrypted eSIM package in accordance with a SimAlliance/GSM Association protocol, such as defined in the "Remote Provisioning Architecture for Embedded UICC Technical Specification Version 3.0", dated 30 Jun. 2015, which is incorporated by reference herein for all purposes. In some embodiments, the encryption uses an SCP03 or SCP03t protocol as specified by one or more 3GPP specifications and/or by one or more GlobalPlatform specifications. In some embodiments, a data packet is encrypted (ciphered) using an Advanced Encryption Standard (AES) with Cipher Block Chaining (CBC) and a Message Authentication Code (MAC) chaining value is appended to a Type Length Value (TLV) message, e.g., Type '86' with Length lce and a Value that is the encrypted data. An R-MAC calculation generates an R-MAC field based on the MAC chaining value appended to the TLV message, and the R-MAC field is then appended to the TLV message for communication to another entity, e.g., from the eUICC 108 to the provisioning server 116. Thus response messages, in a conventional approach, can include both encryption (e.g., using AES-CBC) of the data and signing of the message (e.g., using the R-MAC). The receiving entity, e.g., the provisioning server, can verify integrity of the message, e.g., based on the signature with the R-MAC, and decrypt the message for its content securely. Intervening processing circuitry, e.g., the processor 104 of the mobile device 102, can be unable to read such a message and can simply pass through the encrypted and signed message to the network entity, e.g., to the provisioning server 116. As discussed further herein, response messages from the eUICC 108 can be extended to include a 'Tag' field, with values to indicate one or more properties of the message such as encryption, signing, readability, verifiability, etc.

To provide for secure communication while also allowing for offline loading and installation of eSIM packages to the eUICC 108, enabling readability of at least some of the response messages from the eUICC 108 can be preferred. In some embodiments, response messages provided by the eUICC 108 can be signed, e.g., providing integrity protection using the R-MAC, but not encrypted for communication to processing circuitry of the mobile device 102. In some embodiments, some response messages provided by the eUICC 108 can be encrypted and signed, while other response messages provided by the eUICC 108 can be only signed. In some embodiments, two different MAC keys can be used for response messages from the eUICC 108, one MAC key for those response messages that include encryption and a separate MAC key for those response messages that do not include encryption. In some embodiments, up to four session keys can be used for encryption and signing for communication with the eUICC 108, an encryption key, $K\_enc$, a downlink (to the eUICC 108) message authentication code (MAC) key, $K\_mac$, an uplink (from the eUICC 108) MAC key, $K\_rmac$, and a second uplink MAC key, $K\_rmac2$. In some embodiments, the eUICC 108 can determine for each response message whether to use encryption and signing, signing only, or plain text only. In some embodiments, for a confidential message that uses encryption, e.g., with the K_enc key, and signing, with the K_rmac key, the response message can include a TAG field with an 'A' value to indicate the use of encryption and signing. In some embodiments, for a response message that needs integrity checking only, e.g., by signing with the separate K_rmac2 key, including using a separate MAC chaining state for the separate K_rmac2 key, the eUICC 108 can include a TAG field with a 'B' value to indicate signing only. In some embodiments, for a response message that is sent with plain text only, the eUICC 108 can include a TAG field with a 'C' value to indicate that the message is clear and readable. The use of session keys can ensure authentication between different entities and protect against false response messages (e.g., an anti-reply protection). In some embodiments, one or more network entities maintain session keys, e.g., the K_enc key, the K_rmac key (and its MAC chaining state), and the K_rmac2 key (and its own separate MAC chaining state) until all response messages for the loading and/or installation of the eSIM package is complete (and/or until determining failure and restarting the process). In some embodiments, only a particular network entity responsible for the session keys, e.g., a particular provisioning server 116 and/or the SM-DP unit, can verify integrity of response messages that are signed with the K_rmac2 key.

In some embodiments, a security context for response messages communicated from the eUICC 108 can be independent of provisioning session keys used for secure and integrity verifiable communication with a network entity, e.g., with the provisioning server 116 and/or the SM-DP unit. In some embodiments, the eUICC 108 uses a static key to sign response messages, e.g., a Secret Key for an Elliptic Curve Cryptography Digital Signature Algorithm, SK.E-CDSA. In some embodiments, the eUICC 108 uses the static key for response messages tagged with the value 'B' in the TAG field. In some embodiments, the eUICC 108 includes an eUICC certificate with one or more response messages tagged with the value 'B' in the TAG field. In some embodiments, recipients of such response messages can use a public key, e.g., based on the eUICC certificate, to verify signature of the response messages. In some embodiments, such messages can be forwarded to one or more network entities, such as to provide feedback of warning messages and/or error messages that occur during the loading and/or installation process for the eSIM package. With the static key signature, different entities external to the eUICC 108 can verify the signature. In some embodiments, a server-provided session one-time token can be signed together with the static key signature to provide anti-replay protection.

In some embodiments, processing circuitry of the mobile device 102, e.g., the processor 104, can provide final success response messages to network entities, e.g., the provisioning server 116 and/or the SM-DP unit, without providing intermediate success response messages. In some embodiments, processing circuitry of the mobile device 102 provides indications of the loading and/or installation process state via a user interface of the mobile device 102 based at least in part on readable and/or verifiable eUICC 108 response messages. In some embodiments, processing circuitry of the mobile device 102 provides indications of warnings for one or more non-critical functions that occur during the loading and/or installation process for the eSIM package via a user interface of the mobile device 102 based at least in part on readable and/or verifiable eUICC 108 response messages. In some embodiments, processing circuitry of the mobile device 102 interrupts an ongoing loading and/or installation process for the eSIM package based on receipt of one or more eUICC 108 response messages that indicate occurrence of essential errors, e.g., a Network Access Application (NAA) installation failure, a security error, a memory error, etc. In some embodiments, an OS component of the eUICC 108, e.g., eUICC OS 206, autonomously performs an atomic operation to trigger clean up after an essential error. In some embodiments, processing circuitry of the mobile device 102 provides explicit commands and/or implicit commands to the eUICC 108 to delete eSIM package data that is not properly installed, e.g., in response to one or more response messages from the eUICC 108 that indicates essential errors.

FIG. 6 illustrates a table 600 that includes representative status word (SW) values that provide limited information for response messages communicated from the eUICC 108. The SW values shown in table 600 can be used for responses to STORE DATA commands in accordance with one or more GlobalPlatform specifications. FIG. 6 further illustrates a table 610 that includes a representative data structure, namely the TAG field, which includes values that indicate properties for the TLV portion of response messages provided from the eUICC 108, e.g., during a loading and/or installation of an eSIM package. In some embodiments, the TAG field includes a first value, 'A', which indicates that the TLV value is encrypted, e.g., based on a particular Secure Channel Protocol (SCP), such as SCP03t, which provides for decryption only by particular entities, e.g., by the provisioning server 116 and/or the SM-DP unit, and not by intervening processing circuitry between the particular entities and the eUICC 108. In some embodiments, the TAG field includes a second value, 'B', which indicates that the TLV portion of the response message is signed, e.g., by the eUICC 108, which provides for verification by recipients of the response message that includes the TAG value 'B'. Processing circuitry of the mobile device 102, e.g., the processor 104, can process such response messages, which can be used for error messages and/or warning messages for example, and may also forward the response messages to appropriate network elements, such as to the provisioning server 116 and/or the SM-DP unit. In some embodiments, the TAG field includes a third value, 'C', which indicates that the TLV portion of the response message is in plain text, and thus information of the TLV portion can be read by processing circuitry of the mobile device 102, e.g., by the processor 104. In some embodiments, response messages that include the TAG field value 'C' are used only for communication between the eUICC 108 and processing circuitry of the mobile device 102, e.g., over a trusted communication channel.

Figure 7:
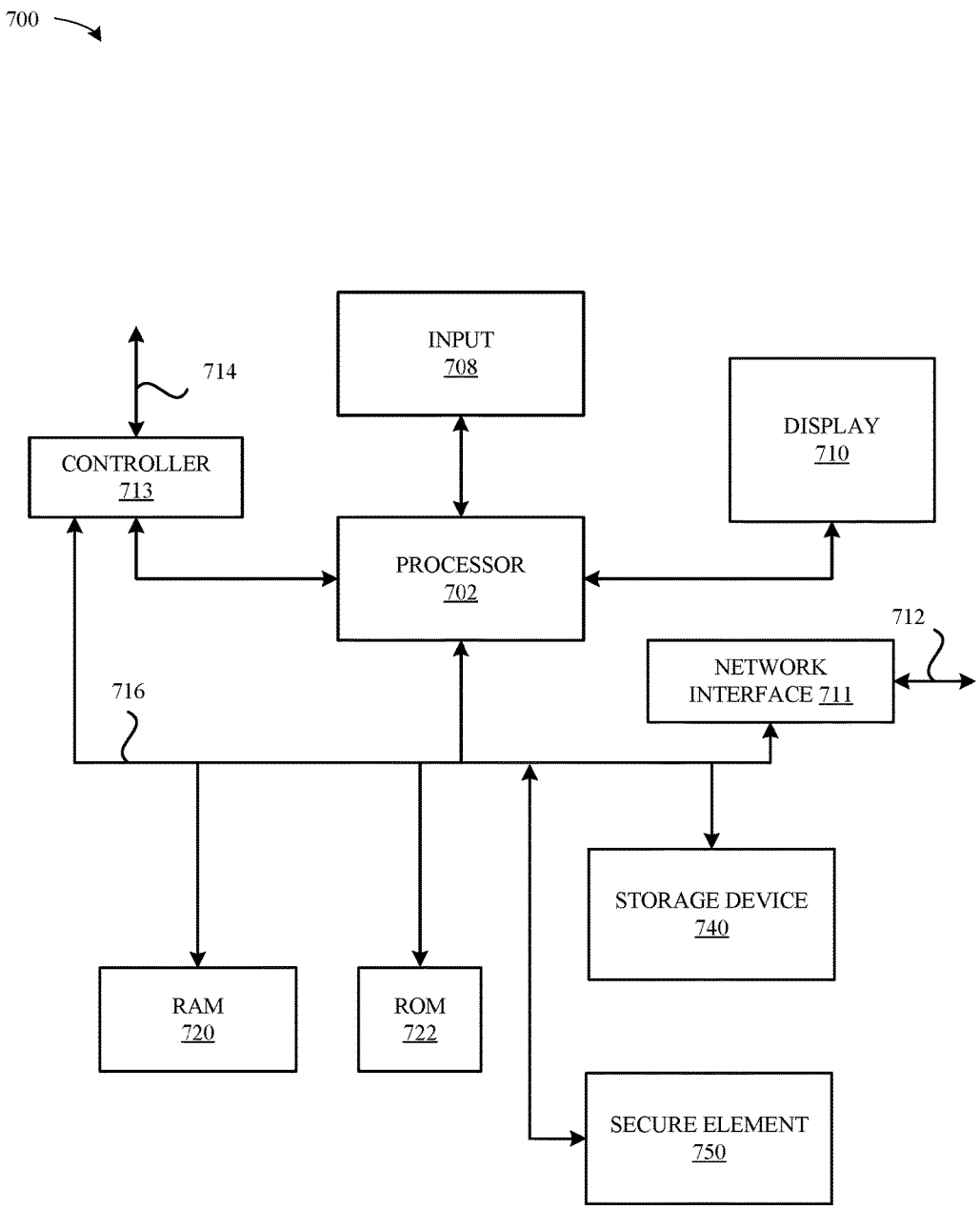
FIG. 7 illustrates a detailed view of a representative computing device that can be used to implement various components described herein, according to some embodiments.

FIG. 7 illustrates a detailed view of a computing device 700 that can be used to implement the various components described herein, according to some embodiments. In particular, the detailed view illustrates various components that can be included in the mobile device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713.

The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element 750, which can represent the eUICC 108 illustrated in FIGS. 1 to 4 and described in detail herein.

Representative Embodiments

In some embodiments, a method for provisioning electronic Subscriber Identity Modules (eSIMs) on an embedded Universal Integrated Circuit Card (eUICC) included in a wireless device performed by processing circuitry of the wireless device external to the eUICC includes: (i) receiving, from a provisioning server via a secure connection, an encrypted eSIM package; (ii) transferring a block of the encrypted eSIM package to the eUICC for loading and installation in an eSIM security domain on the eUICC; (iii) receiving, from the eUICC in response to transfer of the block of the encrypted eSIM package, a response message that includes a tag field that indicates encryption and signing verification applicable to the response message; and (iv) processing the response message in accordance with a value of the tag field.

In some embodiments, a first value for the tag field indicates the response message is encrypted and signed using session keys applicable for a session established by the provisioning server. In some embodiments, the method performed by the processing circuitry of the wireless device external to the eUICC further includes: forwarding the response message to the provisioning server without decrypting contents of the response message. In some embodiments, the method performed by the processing circuitry of the wireless device external to the eUICC further includes: verifying integrity of the response message before forwarding the response message to the provisioning server. In some embodiments, a second value for the tag field indicates the response message is not encrypted and is signed by the eUICC. In some embodiments, the response message is signed using a session key having a message authentication code chain distinct from one or more session keys used for response messages that include a first value for the tag field, the first value indicating encryption and signing using sessions keys applicable for a session established by the provisioning server. In some embodiments, the processing circuitry processes the response message based at least in part on a certificate associated with the eUICC. In some embodiments, the method performed by the processing circuitry of the wireless device external to the eUICC further includes: determining whether to forward the response message to the provisioning server based at least in part on contents of the response message. In some embodiments, a third value for the tag field indicates the response message includes plain text. In some embodiments, the method performed by the processing circuitry of the wireless device external to the eUICC further includes: providing a status indication of loading and/or installation of the encrypted eSIM package via a user interface of the mobile device. In some embodiments, the status indication is based at least in part on information from non-encrypted response messages received from the eUICC. In some embodiments, the method performed by the processing circuitry of the wireless device external to the eUICC further includes: forwarding response messages that include error indications and/or warning indications received from the eUICC to the provisioning server; and forwarding a success message received from the eUICC to the provisioning server after successful completion of loading and/or installation of the encrypted eSIM package.

In some embodiments, a wireless device is configured to provision electronic Subscriber Identity Modules (eSIMs) on an embedded Universal Integrated Circuit Card (eUICC) included in the wireless device, the wireless device including processing circuitry configured to carry out steps that include: receiving, from a provisioning server via a secure connection, an encrypted eSIM package; transferring a block of the encrypted eSIM package to the eUICC for loading and installation in an eSIM security domain on the eUICC; receiving, from the eUICC in response to transfer of the block of the encrypted eSIM package, a response message that includes a tag field that indicates encryption and signing verification applicable to the response message; and processing the response message in accordance with a value of the tag field.

In some embodiments, a first value for the tag field indicates the response message is encrypted and signed using session keys applicable for a session established by the provisioning server. In some embodiments, the steps performed by the processing circuitry further include forwarding the response message to the provisioning server without decrypting contents of the response message. In some embodiments, the steps performed by the processing circuitry further include verifying integrity of the response message before forwarding the response message to the provisioning server. In some embodiments, a second value for the tag field indicates the response message is not encrypted and is signed by the eUICC. In some embodiments, the response message is signed using a session key having a message authentication code chain distinct from one or more session keys used for response messages that include a first value for the tag field, the first value indicating encryption and signing using sessions keys applicable for a session established by the provisioning server. In some embodiments, the processing circuitry processes the response message based at least in part on a certificate associated with the eUICC. In some embodiments, the steps performed by the processing circuitry further include determining whether to forward the response message to the provisioning server based at least in part on contents of the response message. In some embodiments, a third value for the tag field indicates the response message includes plain text. In some embodiments, the steps performed by the processing circuitry further include providing a status indication of loading and/or installation of the encrypted eSIM package via a user interface of the mobile device. In some embodiments, the status indication is based at least in part on information from non-encrypted response messages received from the eUICC. In some embodiments, the steps performed by the processing circuitry further include forwarding response messages that include error indications and/or warning indications received from the eUICC to the provisioning server; and forwarding a success message received from the eUICC to the provisioning server after successful completion of loading and/or installation of the encrypted eSIM package.

In some embodiments, a non-transitory computer-readable storage medium stores instructions that, when executed by processing circuitry of a wireless device, cause the processing circuitry to provision electronic Subscriber Identity Modules (eSIMs) on an Universal Integrated Circuit Card (eUICC) included in the wireless device, by carrying out steps that include: (i) receiving, from a provisioning server via a secure connection, an encrypted eSIM package; (ii) transferring a block of the encrypted eSIM package to the eUICC for loading and installation in an eSIM security domain on the eUICC; (iii) receiving, from the eUICC in response to transfer of the block of the encrypted eSIM package, a response message that includes a tag field that indicates encryption and signing verification applicable to the response message; and (iv) processing the response message in accordance with a value of the tag field.

In some embodiments, a first value for the tag field indicates the response message is encrypted and signed using session keys applicable for a session established by the provisioning server. In some embodiments, the steps further include forwarding the response message to the provisioning server without decrypting contents of the response message. In some embodiments, the steps further include verifying integrity of the response message before forwarding the response message to the provisioning server. In some embodiments, a second value for the tag field indicates the response message is not encrypted and is signed by the eUICC. In some embodiments, the response message is signed using a session key having a message authentication code chain distinct from one or more session keys used for response messages that include a first value for the tag field, the first value indicating encryption and signing using sessions keys applicable for a session established by the provisioning server. In some embodiments, the processing circuitry processes the response message based at least in part on a certificate associated with the eUICC. In some embodiments, the steps further include determining whether to forward the response message to the provisioning server based at least in part on contents of the response message. In some embodiments, a third value for the tag field indicates the response message includes plain text. In some embodiments, the steps further include providing a status indication of loading and/or installation of the encrypted eSIM package via a user interface of the mobile device. In some embodiments, the status indication is based at least in part on information from non-encrypted response messages received from the eUICC. In some embodiments, the steps further include: forwarding response messages that include error indications and/or warning indications received from the eUICC to the provisioning server; and forwarding a success message received from the eUICC to the provisioning server after successful completion of loading and/or installation of the encrypted eSIM package.

In some embodiments, an apparatus for provisioning electronic Subscriber Identity Modules (eSIMs) on an embedded Universal Integrated Circuit Card (eUICC) included in the wireless device, the apparatus includes processing circuitry including: (i) means for receiving, from a provisioning server via a secure connection, an encrypted eSIM package; (ii) means for transferring a block of the encrypted eSIM package to the eUICC for loading and installation in an eSIM security domain on the eUICC; (iii) means for receiving, from the eUICC in response to transfer of the block of the encrypted eSIM package, a response message that includes a tag field that indicates encryption and signing verification applicable to the response message; and (iv) means for processing the response message in accordance with a value of the tag field.

In some embodiments, a first value for the tag field indicates the response message is encrypted and signed using session keys applicable for a session established by the provisioning server. In some embodiments, the processing circuitry further includes means for forwarding the response message to the provisioning server without decrypting contents of the response message. In some embodiments, the processing circuitry further includes means for verifying integrity of the response message before forwarding the response message to the provisioning server. In some embodiments, a second value for the tag field indicates the response message is not encrypted and is signed by the eUICC. In some embodiments, the response message is signed using a session key having a message authentication code chain distinct from one or more session keys used for response messages that include a first value for the tag field, the first value indicating encryption and signing using sessions keys applicable for a session established by the provisioning server. In some embodiments, the processing circuitry processes the response message based at least in part on a certificate associated with the eUICC. In some embodiments, the processing circuitry further includes means for determining whether to forward the response message to the provisioning server based at least in part on contents of the response message. In some embodiments, a third value for the tag field indicates the response message includes plain text. In some embodiments, the processing circuitry further includes means for providing a status indication of loading and/or installation of the encrypted eSIM package via a user interface of the mobile device. In some embodiments, the status indication is based at least in part on information from non-encrypted response messages received from the eUICC. In some embodiments, the processing circuitry further includes means for forwarding response messages that include error indications and/or warning indications received from the eUICC to the provisioning server; and means for forwarding a success message received from the eUICC to the provisioning server after successful completion of loading and/or installation of the encrypted eSIM package.

The various aspects, embodiments, implementations or features of the described embodiments can be used separately or in any combination. Software, hardware, or a combination of hardware and software can implement various aspects of the described embodiments. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for provisioning electronic Subscriber Identity Modules (eSIMs) on an embedded Universal Integrated Circuit Card (eUICC) included in a wireless device, the method comprising:
by processing circuitry of the wireless device external to the eUICC:
receiving, from a provisioning server via a secure connection, an encrypted eSIM package;
transferring a block of the encrypted eSIM package to the eUICC for loading and installation in an eSIM security domain on the eUICC;
receiving, from the eUICC in response to transfer of the block of the encrypted eSIM package, a response message that includes a tag field that indicates encryption and signing verification applicable to the response message; and
processing the response message in accordance with a value of the tag field,
wherein:
a first value for the tag field indicates the response message cannot be decrypted by the processing circuitry of the wireless device external to the eUICC;
a second value for the tag field indicates the response message is signed by the eUICC with a certificate that can be verified by the processing circuitry of the wireless device external to the eUICC;
a third value for the tag field indicates the response message is unencrypted and readable by the processing circuitry of the wireless device external to the eUICC; and
responses having the third value for the tag field are used only for local communication via a trusted communication channel between the eUICC and the processing circuitry of the wireless device external to the eUICC, where response messages having the third value for the tag field are not forwarded to the provisioning server.

2. The method of claim 1, wherein the first value for the tag field indicates the response message is encrypted and signed using session keys applicable for a session established by the provisioning server.

3. The method of claim 2, further comprising:
by the processing circuitry of the wireless device external to the eUICC:
forwarding the response message to the provisioning server without decrypting contents of the response message.

4. The method of claim 3, further comprising:
by the processing circuitry of the wireless device external to the eUICC:
verifying integrity of the response message before forwarding the response message to the provisioning server.

5. The method of claim 1, wherein the second value for the tag field indicates the response message is not encrypted and is verifiably signed by the eUICC.

6. The method of claim 5, wherein the response message is verifiably signed using a session key having a message authentication code chain used only for local communication between the eUICC and the processing circuitry of the wireless device external to the eUICC and is distinct from one or more session keys used for response messages that include a first value for the tag field, the first value indicating encryption and signing using sessions keys applicable for a session established by the provisioning server.

7. The method of claim 5, wherein the processing circuitry processes the response message based at least in part on a certificate associated with the eUICC.

8. The method of claim 5, further comprising:
by the processing circuitry of the wireless device external to the eUICC:
determining whether to forward the response message to the provisioning server based at least in part on contents of the response message.

9. The method of claim 5, wherein the third value for the tag field indicates the response message includes plain text.

10. The method of claim 1, further comprising: by the processing circuitry of the wireless device external to the eUICC: providing a status indication of loading and/or installation of the encrypted eSIM package via a user interface of the wireless device.

11. The method of claim 10, wherein the status indication is based at least in part on information from non-encrypted response messages received from the eUICC.

12. The method of claim 1, further comprising:
by the processing circuitry of the wireless device external to the eUICC:
forwarding response messages that include error indications and/or warning indications received from the eUICC to the provisioning server;
refraining from forwarding to the provisioning server intermediate success messages received from the eUICC during loading and/or installation of the encrypted eSIM package; and
forwarding a final success message received from the eUICC to the provisioning server after successful completion of loading and/or installation of the encrypted eSIM package.

13. A wireless device configured to provision electronic Subscriber Identity Modules (eSIMs) on an embedded Universal Integrated Circuit Card (eUICC) included in the wireless device, the wireless device comprising processing circuitry configured to carry out steps that include:
receiving, from a provisioning server via a secure connection, an encrypted eSIM package;
transferring a block of the encrypted eSIM package to the eUICC for loading and installation in an eSIM security domain on the eUICC;
receiving, from the eUICC in response to transfer of the block of the encrypted eSIM package, a response message that includes a tag field that indicates encryption and signing verification applicable to the response message; and
processing the response message in accordance with a value of the tag field,
wherein:
a first value for the tag field indicates the response message cannot be decrypted by the processing circuitry of the wireless device external to the eUICC;
a second value for the tag field indicates the response message is signed by the eUICC with a certificate that can be verified by the processing circuitry of the wireless device external to the eUICC;

a third value for the tag field indicates the response message is unencrypted and readable by the processing circuitry of the wireless device external to the eUICC; and responses having the third value for the tag field are used only for local communication via a trusted communication channel between the eUICC and the processing circuitry of the wireless device external to the eUICC, where response messages having the third value for the tag field are not forwarded to the provisioning server.

14. The wireless device of claim 13, wherein:

the first value for the tag field indicates the response message is encrypted and signed using session keys applicable for a session established by the provisioning server; and the steps further include forwarding the response message to the provisioning server without decrypting contents of the response message.

15. The wireless device of claim 14, wherein:

the steps further include verifying integrity of the response message before forwarding the response message to the provisioning server.

16. The wireless device of claim 13, wherein:

the second value for the tag field indicates the response message is not encrypted and is verifiably signed by the eUICC using a session key having a message authentication code chain used only for local communication between the eUICC and the processing circuitry of the wireless device external to the eUICC; and the processing circuitry processes the response message based at least in part on a certificate associated with the eUICC.

17. The wireless device of claim 16, wherein the steps further include determining whether to forward the response message to the provisioning server based at least in part on contents of the response message.

18. The wireless device of claim 13, wherein:

the steps further include providing a status indication of loading and/or installation of the encrypted eSIM package via a user interface of the wireless device; and the status indication is based at least in part on information from non-encrypted response messages received from the eUICC.

19. The wireless device of claim 13, wherein the steps further include:

forwarding response messages that include error indications and/or warning indications received from the eUICC to the provisioning server;

refraining from forwarding to the provisioning server intermediate success messages received from the eUICC during loading and/or installation of the encrypted SIM package; and forwarding a final success message received from the eUICC to the provisioning server after successful completion of loading and/or installation of the encrypted eSIM package.

20. A non-transitory computer-readable storage medium storing instructions that, when executed by processing circuitry of a wireless device, cause the processing circuitry to provision electronic Subscriber Identity Modules (eSIMs) on an Universal Integrated Circuit Card (eUICC) included in the wireless device, by carrying out steps that include:

receiving, from a provisioning server via a secure connection, an encrypted eSIM package;

transferring a block of the encrypted eSIM package to the eUICC for loading and installation in an eSIM security domain on the eUICC;

receiving, from the eUICC in response to transfer of the block of the encrypted eSIM package, a response message that includes a tag field that indicates encryption and signing verification applicable to the response message; and processing the response message in accordance with a value of the tag field, wherein:

a first value for the tag field indicates the response message cannot be decrypted by the processing circuitry of the wireless device external to the eUICC;

a second value for the tag field indicates the response message is signed by the eUICC with a certificate that can be verified by the processing circuitry of the wireless device external to the eUICC;

a third value for the tag field indicates the response message is unencrypted and readable by the processing circuitry of the wireless device external to the eUICC; and responses having the third value for the tag field are used only for local communication via a trusted communication channel between the eUICC and the processing circuitry of the wireless device external to the eUICC, where response messages having the third value for the tag field are not forwarded to the provisioning server.

* * * * *